United States Patent
Ahlborn

(10) Patent No.: US 7,591,971 B2
(45) Date of Patent: Sep. 22, 2009

(54) METHOD FOR PRODUCING AN ADHESIVE MOLDED BODY

(75) Inventor: Norbert Marie Ahlborn, Zürich (CH)

(73) Assignee: Weidmann Plastics Technology AG, Rapperswil (CH)

( * ) Notice: Subject to any disclaimer, the term of this patent is extended or adjusted under 35 U.S.C. 154(b) by 578 days.

(21) Appl. No.: 10/502,029

(22) PCT Filed: Jan. 22, 2003

(86) PCT No.: PCT/CH03/00044

§ 371 (c)(1),
(2), (4) Date: Jan. 7, 2005

(87) PCT Pub. No.: WO03/061941

PCT Pub. Date: Jul. 31, 2003

(65) Prior Publication Data

US 2005/0103432 A1    May 19, 2005

(30) Foreign Application Priority Data

Jan. 22, 2002    (CH) .................................... 0103/02

(51) Int. Cl.
*B29C 45/16* (2006.01)
*B29C 70/78* (2006.01)

(52) U.S. Cl. .................. 264/255; 264/275; 156/232; 156/245

(58) Field of Classification Search .................. None
See application file for complete search history.

(56) References Cited

U.S. PATENT DOCUMENTS 6,051,249 A * 4/2000 Samuelsen ................ 424/443

6,458,454 B1 * 10/2002 Kreckel ....................... 428/343
2006/0233959 A1 * 10/2006 Strickland ................ 427/407.1

FOREIGN PATENT DOCUMENTS

| EP | 0 767 00 A | 4/1997 |
| GB | 622456 A | 5/1949 |
| GB | 2 323 554 A | 9/1998 |
| JP | 63312818 A | 12/1988 |
| JP | 57059737 A | 4/1989 |
| WO | WO 95/21734 A | 8/1995 |

* cited by examiner

*Primary Examiner*—Edmund H. Lee
(74) *Attorney, Agent, or Firm*—Sughrue Mion, PLLC

(57) ABSTRACT

The invention relates to a method for producing an adhesive moulded body (1, 1') having an at least partially adhesive outer side (3, 3'), said moulded body being formed in a form tool (6), for example by means of an injection moulding method. According to the invention, an adhesive body (4, 4') or a semi-finished product of an adhesive body (4, 4') is produced, or said adhesive body (4, 4') and semi-finished product can be simultaneously produced. To this end, the tool (6) comprises two separable tool parts (7) and (9), two nozzles (9) and (10) ending in a form cavity (13). An adhesive (12) or a semi-finished adhesive product are sprayed onto the rear side of the film (14). A suitable plastic (11) is sprayed into the form cavity (13) by means of the nozzle (9), in order to form the base body (2'). The nozzle (10) enables the adhesive body (4') to be produced by means of injection moulding. The adhesive body (4') and the base body (2') are essentially simultaneously formed in this way, and both bodies (2') and (4') are interconnected. The inventive moulded body is preferably a component, for example for a motor vehicle.

15 Claims, 1 Drawing Sheet

METHOD FOR PRODUCING AN ADHESIVE MOLDED BODY

FIELD AND BACKGROUND OF THE INVENTION

This invention relates to a method for producing a bondable molded part according to the definition of the species of Claim 1. Such molded parts, e.g., components in automotive engineering, are produced by bonding two-sided adhesive tape to a base body. The outside of the adhesive tape applied to the base body is covered with a removable film. To attach the part to a housing, for example, the film is pulled off and the part is pressed in the intended location with the adhesive outside of the adhesive tape.

Fastening a part by means of two-sided adhesive tape has some important advantages in comparison with conventional fastening means, e.g., fastening screws, because rapid assembly is possible without requiring additional elements and it takes up very little space. Pressure-sensitive adhesives having an improved adhesive power are known and thus also permit good fastening of parts with appropriate pressure-sensitive adhesive tape accordingly. In the case of glass-filled or foamed adhesive tape with a higher density (usually 0.4-1 mm [sic]), permanent bonding of materials having different thermal expansion coefficients, e.g., aluminum plastic are possible. However, one disadvantage is that adhesives having a high viscosity and adhesive strength are difficult to process. And adhesive must be produced under protective gas and/or in the absence of oxygen. Adhesive tape with a high adhesive power produced in this way is therefore comparatively expensive.

The state of the art in the field of pressure-sensitive adhesives is described, for example, by I. Benedek, L. J. Heyman, "Pressure Sensitive Adhesive Technology," Marcel Decker Inc., $1^{st}$ edition, 1997. Basic polymers which are used as precursors of modern adhesives include mainly polyacrylates, natural and synthetic rubbers, polyesters, polychloroprene, polyisobutenes, polyvinyl ethers, polyurethanes and polysiloxanes, which are mixed with additives such as resins, plasticizers, fillers and stabilizers. In addition, applying the adhesive tape is complicated because the adhesive tape must be cut out or punched. Another disadvantage is that it is difficult to apply such adhesive tape to uneven or spherical surfaces.

WO 95/21734 discloses a bondable molded part made of plastic and a method for producing this molded part. The bondable molded part has an integrated adhesive part of a hot-melt adhesive. The adhesive part is produced in an injection mold in a separate step. The molded part is then cast onto the adhesive part, forming a flow seam. The adhesive part of the bondable molded part produced in this way is hard at ambient temperature and must be heated, e.g., by heat radiation, before the effective bonding operation. The required previous heating of the hot-melt adhesive before the effective bonding operation is complicated or even impossible for many applications.

European Patent 0 767 040 A relates to a method of bonding to a solid body. In this method an open cavity is sealed with the solid body and the adhesive is integrally molded on the body. The cavity is then filled completely with the adhesive. The adhesive is converted to a non-flowing material and finally removed from the mold. Closing a cavity with a part made of plastic is difficult and the high pressures used in injection molding processes in the usual way are impossible here. In addition, because of the sealing and supporting border, the entire surface up to the edge cannot be provided with adhesive.

Japanese Patent 57 059 737 A discloses a method and a device for producing a plastic part with an adhesive layer. In an extrusion mold, the plastic part is extruded through a slot and at the same time the adhesive is extruded and bonded to the plastic part. However, only films can be produced by this method.

Japanese Patent 63 31 28 18 A discloses a method in which a body is provided with an adhesive layer of a hot-melt adhesive to which metal powder is added. For bonding the body, the adhesive layer is heated by induction. It is complicated to heat an adhesive layer before bonding and in many cases it is not even possible.

OBJECTS OF THE INVENTION

The object of this invention is to create a method of the aforementioned type which avoids the aforementioned disadvantages and thus with which parts of the aforementioned type can be produced and assembled less expensively.

SUMMARY OF THE INVENTION

This invention is achieved with a generic method according to the characterizing part of Claim 1. The base body and adhesive body and/or the precursor may be produced by sequential injection molding in the mold. The mold may be provided with a special coating on the contact side toward the adhesive and/or the adhesive precursor to reduce adhesion. Expensive pressure-sensitive adhesive tape need not be used in the inventive method. The adhesive body thus forms an element of the part from the time of its production in the inventive method. This also allows the production of adhesive regions which are uneven. For example, the adhesive region may extend over an edge or a corner of the base body. It is fundamentally also possible to design the entire outside of the base body to be adhesive, but its outer shape may essentially be of any desired type. The surface of the base body may be modified partially or entirely to improve adhesion before applying the adhesive body. Such a surface treatment may include, for example, flaming, corona treatment, plasma treatment, etc. This may be accomplished in an injection mold while the mold is opened briefly, for example.

A pressure-sensitive adhesive is understood here to refer to an adhesive which yields adequate adhesive force at room temperature merely by applying pressure and without any activation. The English term "pressure-sensitive adhesives" for such adhesives expresses this clearly. A pressure-sensitive adhesive is permanently tacky and permanently adhesive and differs from a solid adhesive, for example, which cures due to physical or chemical reactions.

An injection molding method is preferred here. This makes it possible to produce high-precision molded parts. The thickness as well as the area of the adhesive body may thus be defined precisely. Very thin adhesive areas are also possible. To produce very thin layers, special injection molding methods such as injection embossing may be used. In addition, the adhesive area may be foamed during production and/or crosslinked in the mold. For example, secondary crosslinking of adhesive precursors or the formation of an adhesive or an adhesive precursor by mixing and crosslinking may be performed during processing. Processing refers to the processing steps of injection molding as well as preliminary and subsequent processing steps. In any case, the result is a pressure-sensitive adhesive with permanent adhesive properties. The pressure-sensitive adhesive base is preferably a precursor capable of pressure-sensitive adhesion. The pressure-sensitive adhesive base may be a reactive dilute system with a UV initiator and thermally blocked free radical-forming agents. However, solvent systems and hot-melt pressure-sensitive adhesives (PSAs) are also possible and these may also include other crosslinking possibilities. Suitable polymers (precursors) include in particular acrylates, the essentially known SIS/SBS/SEBS pressure-sensitive adhesives, polyurethane pressure-sensitive adhesives and silicone pressure-sensitive adhesives. In addition, the adhesives or adhesive precursors may be functionalized in any desired manner and may be used, for example, as information media, e.g., with colors for allocation or antistatics, flame retardants, etc.

According to one embodiment of this invention, the adhesive body is covered with a releasable film or layer which may advantageously be accomplished by inserting such a film or layer into a mold. The film, i.e., layer, is then backmolded to form the adhesive body. The film, i.e., layer, may be preformed three-dimensionally even before inserting it into the mold or it may be shaped during processing. The film or layer here assumes the function of a liner (protective film of the pressure-sensitive adhesive), thereby preventing high adhesion between the surface of the mold and the pressure-sensitive adhesive and/or pressure-sensitive adhesive precursor.

According to a further embodiment of this invention, the adhesive body is first produced as a precursor. In another step the precursor is modified so as to yield a pressure-sensitive adhesive layer. This may be accomplished by input of energy, e.g., by UV, VIS or IR radiation, otherwise known as electromagnetic radiation or electron radiation. Likewise, heat-initiated or chemical processes are also possible. For example, the adhesive properties can be modified in this way immediately before or after installation of the molded part, in particular to increase the adhesive properties. The input of energy may also be accomplished by induction. To this end, the adhesive body must be provided with a metal powder as an additive. In this embodiment, an SEBS is preferably used as the basic powder. The tackifier is encapsulated by a polymer which may also be SEBS. The input of energy mentioned above cancels the encapsulation and initiates the chemical reaction.

According to another refinement of this invention, a partial modification of the properties is also possible. Locally different properties can be achieved with masking in the radiation, for example.

Production is especially inexpensive when according to a refinement of this invention the molded part is produced in a two-component injection molding process. Using a first nozzle, the base body is injected into the mold cavity and then using a second nozzle the adhesive body is injected. Essentially, a multi-component injection molding process using more than two components is also conceivable. This part may have, for example, in addition to an adhesive body and a base body, a third body which is more elastic than the base body, for example, and exercises a sealing function. There is also an embodiment in which the adhesive body is formed simultaneously as a sealing compound. The second and third bodies may each also be adhesive compounds having different properties (tack, strength, etc.). Basically all special methods are conceivable for use as the multi-component injection molding process (core back, index plates, rotating disk, conversion methods, etc.).

An especially suitable application of such molded parts is for use as components in automotive engineering in particular. The component may be, for example, a part of the exterior or interior paneling, an entrance strip or a lining in the engine space. The adhesive body or bodies may be the locations where this component is attached. Such a body is also particularly suitable for producing a housing which may be, for example, a housing for an electric device. The functions of joining and sealing here may be replaced by an integrally molded adhesive component. In addition, other products are also conceivable, e.g., those in the sanitation field.

BRIEF DESCRIPTION OF THE DRAWINGS

This invention is explained in greater detail below on the basis of the drawing, in which.

DETAILED DESCRIPTION OF THE PREFERRED EMBODIMENTS

Figure 1:
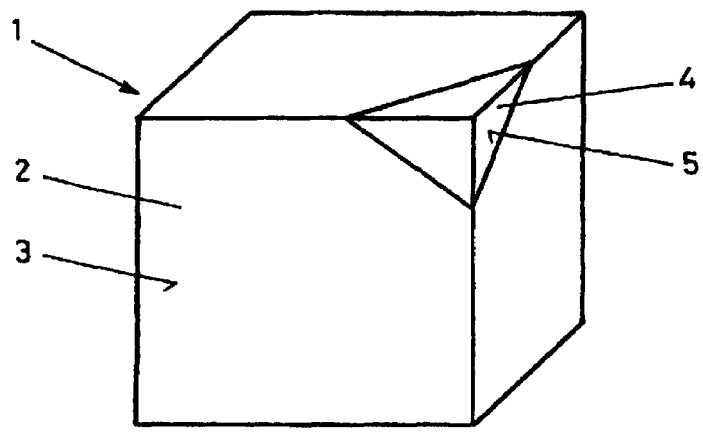
FIG. 1 shows schematically a three-dimensional view of a part according to this invention.

FIG. 1 shows an inventive bondable molded part 1 having a base body 3 with an outside 3 and an adhesive body 4 with an adhesive outside 5. The base body 2 is preferably made of a plastic, e.g., a thermoplastic or a metal and has essentially any desired form. The adhesive body 4 is applied directly to the base body 2, forming a unit with it. The adhesive body 4 is a pressure-sensitive adhesive or a pressure-sensitive adhesive precursor to a pressure-sensitive adhesive, e.g., a pressure-sensitive adhesive based on acrylate, SIS, SBS, SEBS, polyurethane or silicone, a hot-melt adhesive or a solvent-based adhesive or a reactive pressure-sensitive adhesive. The adhesive body 4 in part 1 according to FIG. 1 extends over a corner. Essentially this adhesive body 4 may also be situated at any other location on the outside 3, however. For example, it may also extend over an edge or may be designed as sheet. The thickness of the adhesive body 4 may vary. In particular, this adhesive body 4 may be very thin. However, the adhesive body 4 is not a hot-melt adhesive which is solid at ambient temperatures and must be heated for bonding.

Figure 2:
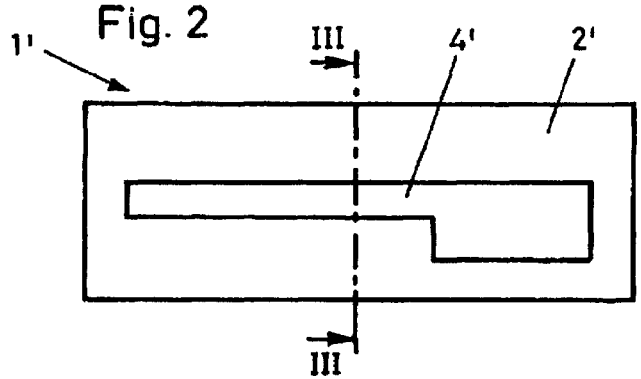
FIG. 2 shows a view of another part according to this invention.
Figure 3:
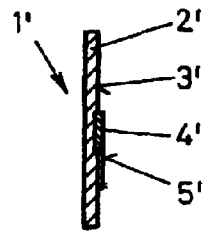
FIG. 3 shows a section along line III-III in FIG. 2

FIG. 2. and FIG. 3 show a molded part 1' which has a base body sheet 2' and an adhesive body 4'. This adhesive body 4' has an adhesive surface 5' which may be flush, elevated or recessed with respect to an outside 3' of the base body 2'. The adhesive surface 5' may also be covered here with a film (not shown) or some other removable layer. The film or layer may be produced from different materials, e.g., from plastic, paper or metal. Siliconized plastic films, also called liners, are essentially known in the field of pressure-sensitive adhesive tape. The adhesive body 4' may also be a pressure-sensitive adhesive that is not yet crosslinked. The crosslinking may take place in a subsequent process, e.g., through UV radiation, IR radiation, VIS radiation or by heating in an essentially known manner. Energy for the crosslinking reaction or for initiation of the crosslinking reaction may also be applied electromagnetically or electrically. The adhesive body 4' may thus be a precursor whose conversion, e.g., crosslinking, to alter the adhesive properties and the viscosity takes place in a subsequent process step. Furthermore the adhesive body 4' may be foamed or may be designed so that it can be foamed in a subsequent process step. This is of course also true of the adhesive body 4 of the molded part 1.

Figure 4:
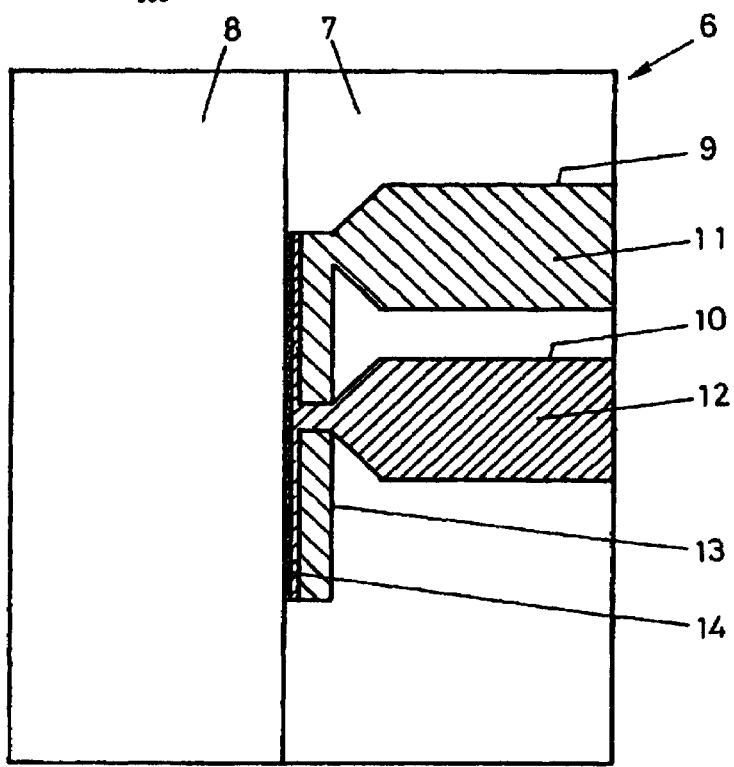
FIG. 4 shows schematically a section through a mold for producing the method [sic; product] according to this invention.

According to a suitable method, the base body 2' and the adhesive body 4' are produced essentially simultaneously in a mold 6 according to FIG. 4. The method preferably has the following steps:

a) Injection molding the first component (e.g., thermoplastic)

b) Opening the mold, pulling the core, inserting films c) Injection molding the pressure-sensitive adhesive, e.g., the PSA precursor.

The mold 6, which is merely indicated schematically here, has two separable mold parts 7 and 8 for this purpose. Two nozzles 9 and 10 open into a mold cavity 13. An adhesive 12 or an adhesive precursor is backmolded onto the film 15. With the nozzle 9, a suitable plastic 11 is injected into the mold cavity 13 to form the base body 2'. The adhesive body 4' is produced with the nozzle 10 by injection molding. The adhesive body 4' and the base body 2' are thus formed essentially simultaneously and the two bodies 2' and 4' are joined together. After injecting the two bodies 2' and 4', they are removed from the mold. The adhesive body 4' can be crosslinked in another step, as mentioned above, or its adhesive properties may be additionally modified. Essentially the film 14 may also be omitted. Such a film 14 could also be applied after injection molding.

The injection molding of the adhesive molded part may also take place after transferring the base body from a first mold to a second mold. The base body may also be transferred from a first cavity to a second cavity of the same mold and then bonded or integrally molded onto the adhesive body there in the second cavity.

This invention relates to a method in which no base body is produced. In this case the part is formed completely by the adhesive body and/or by a precursor, with additives, e.g., an inexpensive filler such as talc also being possible.

The adhesive part 4 or 4' may also be designed so that it has other properties in addition to the adhesive property. It may be designed in particular as a pigmented body, as an electric conductor or it may have a physical or chemical barrier effect. Furthermore, it may also be produced from several pressure-sensitive adhesives and/or precursors and/or pressure-sensitive adhesive precursors or in combination with other materials.

The molded part is produced by the injection molding process, where a wide variety of very different and also very complex and precise shapes are possible. At the same time two different adhesives and/or precursors having different properties may also be produced at the same time.

What is claimed is:

1. A method for producing a bondable molded part having an adhesive on the outside in at least some areas, comprising:

producing a base body by injection molding in a closed mold;

producing an adhesive body by injection molding in the closed mold;

wherein the adhesive body is produced from a pressure-sensitive adhesive or a precursor of a pressure-sensitive adhesive, and wherein the adhesive body or a precursor of an adhesive body is applied to the base body, so that the adhesive body or the precursor together with the base body form a unit, whereby in the case of the precursor, it is converted to an adhesive.

2. The method according to claim 1, characterized in that the adhesive body and/or the precursor of the adhesive body is/are provided with an additive.

3. The method as claimed in claim 2, characterized in that the additive is a plasticizer or a tackifier.

4. The method as claimed in claim 2, characterized in that the additive prevents or suppresses external influences.

5. The method as claimed in claim 2, characterized in that the additive comprises glass beads.

6. The method as claimed in claim 2, characterized in that the additive is a metal powder.

7. The method as claimed in claim 1, characterized in that the adhesive body is covered with a detachable film or layer.

8. The method as claimed in claim 7, characterized in that the film is placed in the mold and backmolded.

9. The method as claimed in claim 1, characterized in that the adhesive body is produced first as a precursor and is converted to the adhesive body in an additional process step.

10. The method as claimed in claim 9, characterized in that the precursor is modified, through a transparent or partially transparent protective film.

11. The method as claimed in claim 1, characterized in that the molded part is produced by a multi-component injection molding process.

12. The method as claimed in claim 1, characterized in that the adhesive body and/or the precursor is foamed when it is produced or at a later point in time.

13. The method as claimed in claim 1, characterized in that the adhesive body is crosslinked in an additional process step or in a subsequent crossliniking process after being applied to a base body.

14. The method as claimed in claim 1, characterized in that the adhesive body is plastically deformable after being crosslinked.

15. The method as claimed in claim 8, characterized in that the adhesive body and/or the precursor is integrally molded onto a base body.

\* \* \* \* \*